US010817926B2

(12) United States Patent
Schwantes et al.

(10) Patent No.: US 10,817,926 B2
(45) Date of Patent: Oct. 27, 2020

(54) COORDINATING DIRECT PAYMENT OF A DELIVERY ORDER BY A DELIVERY SERVICE

(71) Applicant: Maplebear, Inc., San Francisco, CA (US)

(72) Inventors: David Schwantes, Berkeley, CA (US); Denise Hoi Shuen Leung, San Mateo, CA (US)

(73) Assignee: Maplebear, Inc., San Francisco, CA (US)

( * ) Notice: Subject to any disclaimer, the term of this patent is extended or adjusted under 35 U.S.C. 154(b) by 286 days.

(21) Appl. No.: 15/943,507

(22) Filed: Apr. 2, 2018

(65) Prior Publication Data

US 2019/0304004 A1 Oct. 3, 2019

(51) Int. Cl.
| | |
|---|---|
| *G06Q 30/00* | (2012.01) |
| *G06Q 30/06* | (2012.01) |
| *G06Q 30/02* | (2012.01) |
| *G06Q 10/08* | (2012.01) |
| *G06Q 20/10* | (2012.01) |
| *G06Q 20/36* | (2012.01) |

(52) U.S. Cl.
CPC ..... *G06Q 30/0635* (2013.01); *G06Q 10/0836* (2013.01); *G06Q 10/0875* (2013.01); *G06Q 20/102* (2013.01); *G06Q 20/367* (2013.01); *G06Q 30/0227* (2013.01)

(58) Field of Classification Search
CPC ................................................ G06Q 30/0635
See application file for complete search history.

(56) References Cited

U.S. PATENT DOCUMENTS

| | | | |
|---|---|---|---|
| 2009/0198617 A1* | 8/2009 | Soghoian | G06Q 20/04 705/65 |
| 2015/0193859 A1* | 7/2015 | Colello | G06Q 30/0635 705/14.23 |
| 2019/0378081 A1* | 12/2019 | Swartz | G06Q 20/3224 |

OTHER PUBLICATIONS

Emily, B. Y. (Jun. 30, 2013). Upscale grocers bagging growth: Plum market is the latest contender in an expanding premium segment. Chicago Tribune Retrieved from https://search.proquest.com/docview/1372416641?accountid=14753.*

* cited by examiner

*Primary Examiner* — Kathleen Palavecino
(74) *Attorney, Agent, or Firm* — Fenwick & West LLP (57) ABSTRACT

An online concierge system receives an order from a customer with a list of items and allocates the order to a retailer at which the items can be picked. The retailer is associated with a payment processing system having a corresponding tokenization process. The online concierge system uses the tokenization process for the retailer to generate a payment token for the customer based on stored payment data and transmits the payment token to the payment processing system. The online concierge system determines a first payment amount from the customer to the retailer based on items picked at the retailer and a second payment amount from the retailer to the online concierge system. The payment processing system charges the customer a sum of the first payment amount and the second payment amount using the payment token. The online concierge system receives the second payment amount from the payment processing system.

20 Claims, 7 Drawing Sheets

COORDINATING DIRECT PAYMENT OF A DELIVERY ORDER BY A DELIVERY SERVICE

BACKGROUND

This invention relates generally to a method of coordinating payment of a delivery order fulfilled by a concierge delivery service at a retailer and delivered to a customer.

In current delivery fulfillment systems, shoppers fulfill orders at a physical retailer on behalf of customers as part of an online shopping concierge service. Each customer makes a payment to an online concierge system for items and service fees, e.g., using a credit card. When a shopper collects items in the order at a retailer, the shopper purchases the items from the retailer, e.g., using a credit card provided by the online concierge system. Thus, each order fulfillment involves two transactions for the cost of the items—a first transaction from the customer to the online concierge system, and a second transaction from the online concierge system to the retailer. Using multiple transactions to pay for the same goods has undesirable consequences; for example, the second transaction consumes the shopper's time and the retailer's checkout resources, and performing two transactions results in two transaction fees that are paid to a payment processing service. In some systems, the online concierge system can transact directly with a payment processing system of the retailer, and the shopper does not pay for the items with a credit card. However, this process still involves a separate transaction between the concierge system and the customer, and because different retailers use different payment processing systems, this process cannot be uniformly applied to all retailers serviced by the online concierge system.

SUMMARY

To reduce the total amount of money transferred between the parties involved in an online concierge order managed by an online concierge system and allow the retailer to directly charge the customer for the items in the order, the online concierge system can coordinate the payment of a delivery order through a retailer's payment processing system. To coordinate payment between a customer and multiple different retailers, the online concierge system can securely store a user's payment information and, when a new order is received, tokenize the customer's payment information, and provide the token to the appropriate payment processing system. If the online concierge system has previously tokenized the customer's payment information, the online concierge system can retrieve the tokenized payment information and provide it to the payment processing system. The retailer authorizes the order and directly charges the customer for the full cost of the order, including any delivery fee, service fee, or tips. The retailer then transfers the fees for the online concierge service to the online concierge system. The online concierge system can calculate the payments, determine allocations between the concierge service and one or more retailers, and provide instructions to payment processing systems for carrying out the payments.

More particularly, in some embodiments, an online concierge system receives an order from a customer with a list of items to be fulfilled by the online concierge system. The online concierge system allocates the order to a retailer at which at least a portion of the items can be picked. The retailer is associated with a payment processing system of a plurality of payment processing systems. Each of the plurality of payment processing systems have a corresponding tokenization process. The online concierge system uses the tokenization process corresponding to the payment processing system to generate a payment token for the customer based on stored payment data for the customer, and transmits the payment token to the payment processing system. The online concierge system determines a first payment amount from the customer to the retailer based on items picked at the retailer and a second payment amount from the retailer to the online concierge system. The online concierge system transmits a payment request including the first and second payment amounts to the payment processing system. The payment processing system charges the customer a sum of the first payment amount and the second payment amount using the payment token. The online concierge system receives the second payment amount from the payment processing system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment of a Shopping Assistance Platform

Figure 1:
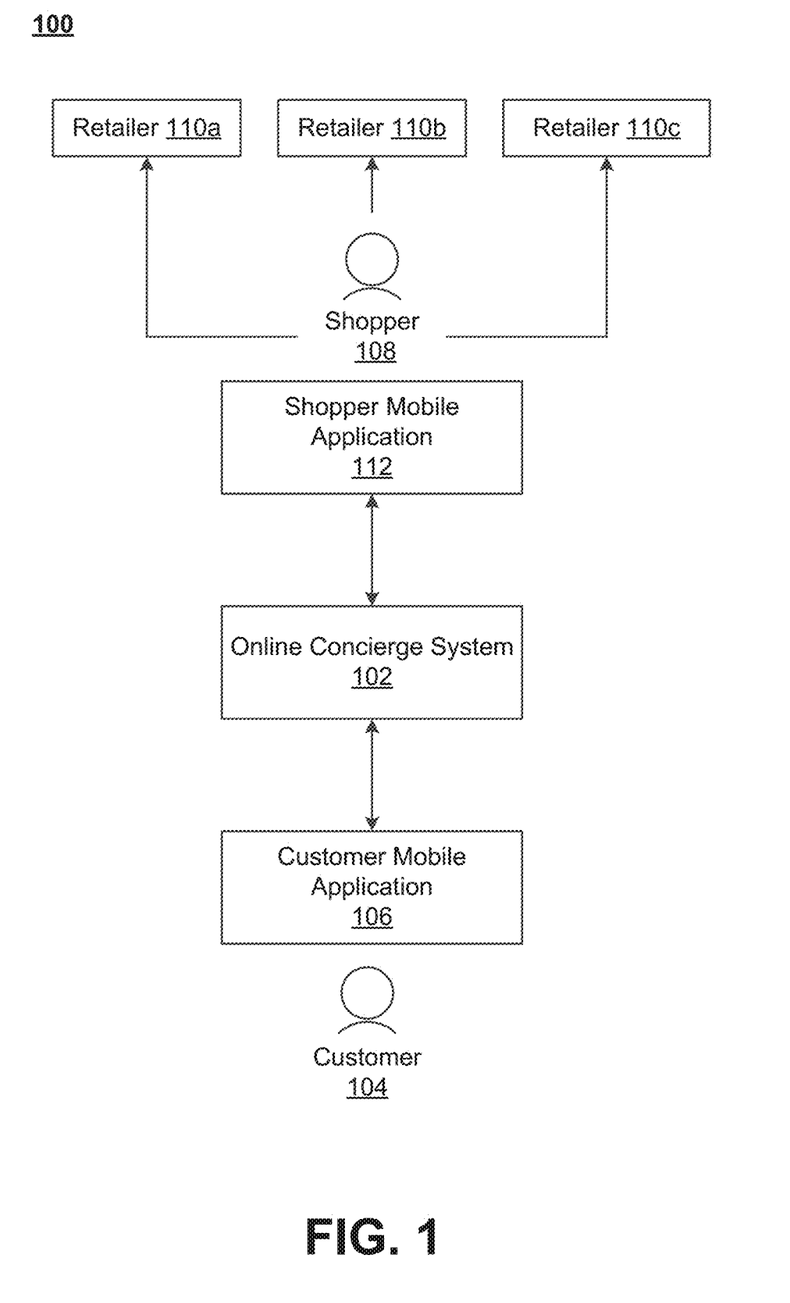
FIG. 1 illustrates and environment of an online shopping concierge service, according to one embodiment.

FIG. 1 illustrates the environment 100 of a shopping assistance platform, according to one embodiment. The environment 100 includes an online concierge system 102, which provides an online shopping concierge service. The online concierge system 102 is configured to receive orders from one or more customers 104 (only one is shown for the sake of simplicity). An order specifies a list of goods (items or products) to be delivered to the customer 104. In some embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more shoppers 108. A shopper 108 may be a contractor, employee, or other person (or entity) who is enabled to fulfill orders received from the online concierge system 102. The environment 100 also includes three retailers 110*a*, 110*b*, and 110*c* (only three are shown for the sake of simplicity; the environment could include hundreds of retailers). Each shopper 108 fulfills an order received from the online concierge system 102 at one or more retailers 110, delivers the order to the customer 104, or performs both fulfillment and delivery. In one embodiment, shoppers 108 make use of a shopper mobile application 112 which is configured to interact with the online concierge system 102.

Online Concierge System

Figure 2:
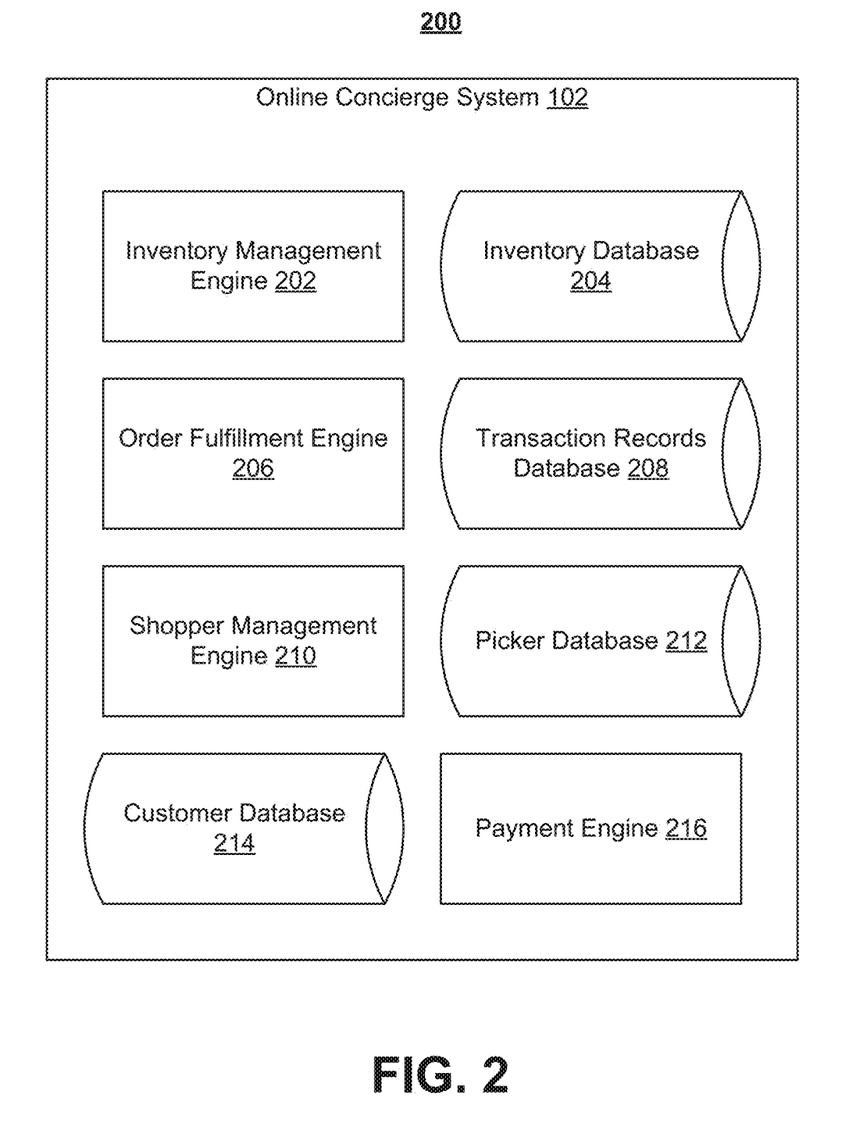
FIG. 2 is a diagram of an online concierge system, according to one embodiment.

FIG. 2 is a diagram of the online concierge system 102, according to one embodiment. The online concierge system 102 includes an inventory management engine 202, which interacts with inventory systems associated with each retailer 110. In one embodiment, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110, or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204.

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which retailers 110. The order fulfillment engine 206 determines a sale price for each item ordered by a customer 104. Prices set by the order fulfillment engine 206 may or may not be identical to in-store prices determined by retailers 110 (which is the price that customers 104 and shoppers 108 would pay at the retailer 110).

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 allocates the order to an appropriate retailer 110 at which to fulfill the order based on one or more parameters, such as the contents of the order, the inventory of the retailers 110, and the proximity to the delivery location. In some embodiments, a single order is allocated to multiple retailers 110, e.g., if all of the items cannot be picked at a single retailer. The shopper management engine 206 then identifies one or more shoppers 108 to fulfill the order based on one or more parameters, such as the shopper's proximity to the appropriate retailer(s) 110 (and/or to the customer 104), his/her familiarity level with the selected retailer(s) 110, and so on. Additionally, the shopper management engine 210 accesses a shopper database 212 which stores information describing each shopper 108, such as his/her name, gender, rating, previous shopping history, and so on. The shopper management engine 210 transmits the list of items in the order to the shopper 108 via the shopper mobile application 112.

As part of fulfilling an order, the order fulfillment engine 206 may access a customer database 214 which stores information describing each customer. This information could include each customer's name, address, gender, shopping preferences, favorite items, stored payment instruments, and so on.

The order fulfillment engine 206 also interacts with a payment engine 216 to facilitate transactions associated with each order. The payment engine 216 transmits payment information to one or more external payment processors to process payment for the order. For example, the payment engine 216 can transmit customer payment data to the payment processor used by the retailer 110 that was selected for fulfilling the order. The retailer 110 then charges the customer 104, and can return a portion of the charge to the online concierge system 102 as instructed by the payment engine 216. The payment engine 216 stores payment and transactional information associated with each order, e.g., in a transaction records database 208 or in a local database. The payment engine 216 is described in further detail with respect to FIG. 4.

Figure 3A:
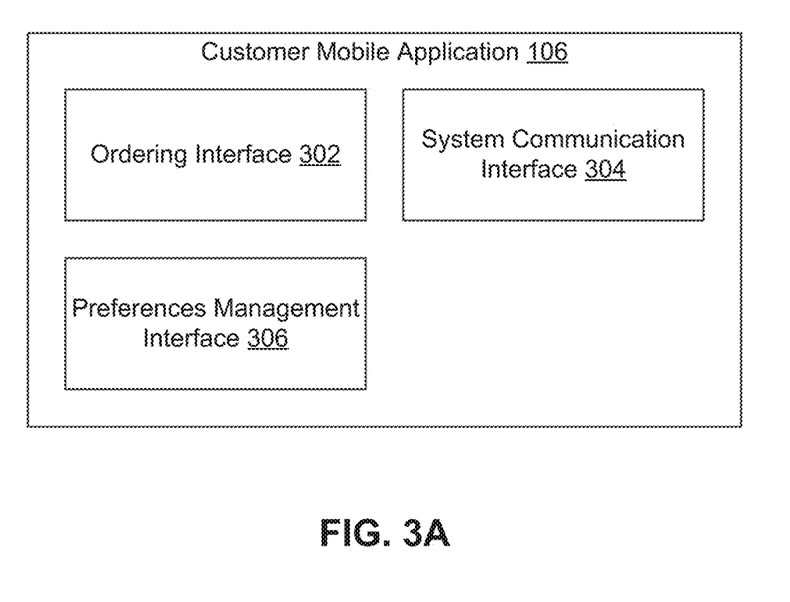
FIG. 3A is a diagram of a customer mobile application (CMA) 106, according to one embodiment.

FIG. 3A is a diagram of the customer mobile application (CMA) 106, according to one embodiment. The CMA 106 includes an ordering interface 302, which provides an interactive interface with which the customer 104 can browse through and select products and place an order. The CMA 106 also includes a system communication interface 304 which, among other functions, receives inventory information from the online concierge system 102 and transmits order information to the online concierge system 102. The CMA 106 also includes a preferences management interface 306 which allows the customer 104 to manage basic information associated with his/her account, such as his/her home address and payment instruments. The preferences management interface 306 may also allow the user to manage other details such as his/her favorite or preferred retailers 110, preferred delivery times, special instructions for delivery, and so on. Rather than using the CMA 106, the customer 104 may interact with the online concierge system 100, e.g., to submit orders and manage preferences using another type of client application or interface, such as a website.

Figure 3B:
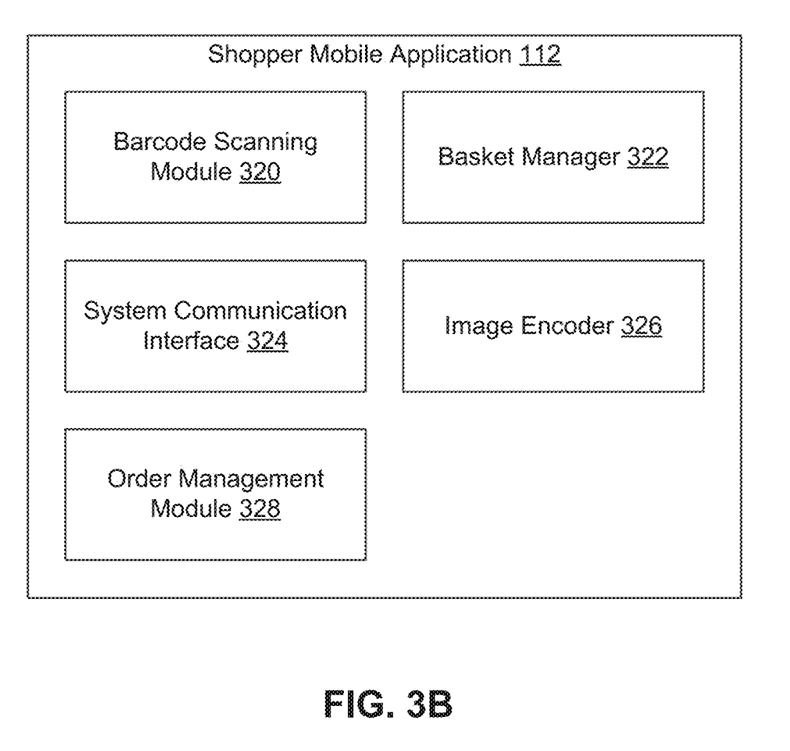
FIG. 3B is a diagram of a shopper mobile application (SMA) 112, according to one embodiment.

FIG. 3B is a diagram of the shopper mobile application (SMA) 112, according to one embodiment. The SMA 112 includes a barcode scanning module 320 which allows a shopper 108 to scan an item at a retailer 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. The SMA 112 also includes a basket manager 322 which maintains a running record of items collected by the shopper 108 for purchase at a retailer 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online concierge system 102. For example, the system communication interface 324 receives an order from the online concierge system 102 and transmits the contents of a basket of items to the online concierge system 102. The SMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

Figure 4:
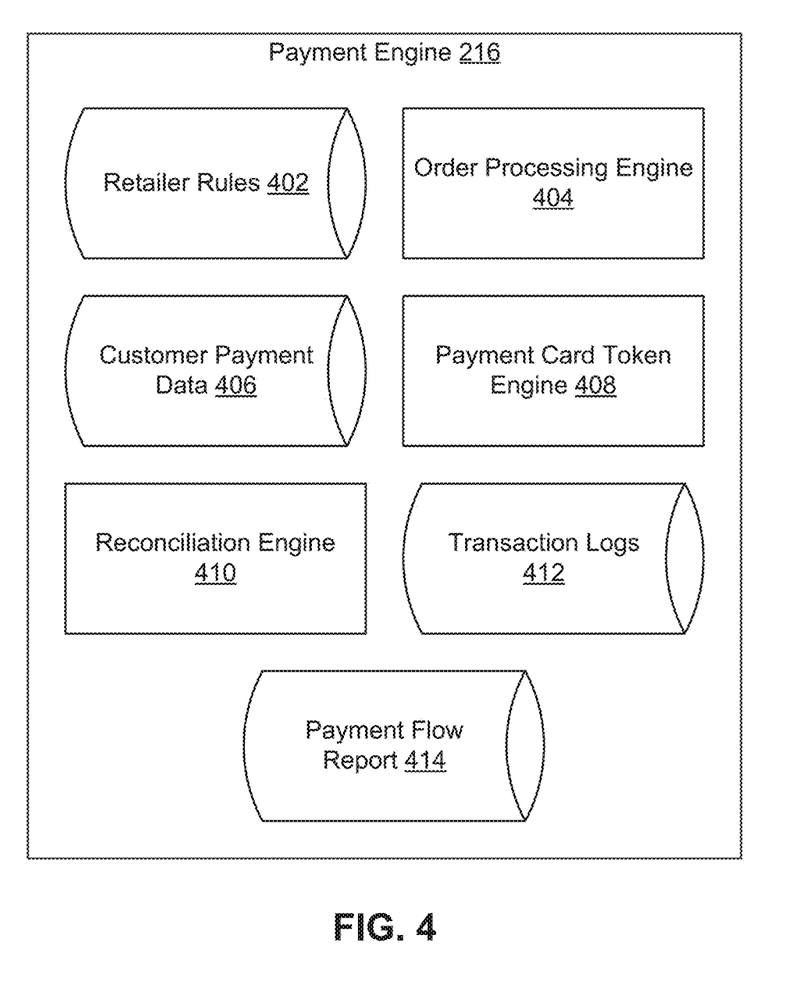
FIG. 4 is a diagram of a payment engine included in the online concierge system, according to one embodiment.

FIG. 4 is a diagram of a payment engine 216 included in the online concierge system 102, according to one embodiment. The payment engine 216 includes a database of retailer rules 402. The retailer rules 402 provide rules for individual retailers 110 regarding payment and processing of delivery orders. For example, the retailer rules 402 for a retailer 110 can identify a payment processing system used by the retailer 110 and, in some embodiments, information for accessing the retailer's account in payment processing system. For example, a retailer 110 can receive and remit payments via a third party payment processing system, such as STRIPE or WORLDPAY. Alternatively, a retailer 110 can implement its own payment processing system for receiving and remitting payments. Alternatively, the online concierge system 102 has its own payment processing system that is used by some or all of the retailers 110. The retailer rules 402 can also indicate a tokenization method used by a retailer 110 or a payment processing system. The retailer rules 402 can include rules regarding how the retailer 110 handles orders with particular types of products, such as alcohol or tobacco. The retailer rules 402 can further include rules that affect pricing, such as discounts, coupons, or markups associated with a retailer 110. The retailer rules 402 can include rules regarding timing of payments, e.g., a schedule at which the retailer remits money to the online concierge system 102.

The payment engine 216 also includes an order processing engine 404, which handles payment processing of a received order. The order processing engine 404 receives from the order fulfillment engine 206 an indication of the retailer to which an order has been allocated. The order processing engine 404 determines the amount that retailer 110 will charge for the goods (e.g., based on data in the inventory database 204) and an amount that the online concierge system 102 will charge for the service, e.g., one or more of a flat service and/or delivery fee, a percentage service and/or delivery fee, a tip, etc. As a simple example, the cost of an order at the retailer is $100, and the online concierge system assesses a 10% service fee, so the total order price is $100+$10=$110. The online processing engine 404 can provide the total order price to the customer via the ordering interface 302. The order processing engine 404 also provides the total order price to the payment processing system for the retailer, as indicated by the retailer rules 402. In some embodiments, the order processing engine 404 may adjust the price, e.g., to add a buffer for possible substitutions made by the shopper when picking the order. The retailer 110 authorizes the order using the customer's payment method, or can charge the customer immediately upon receiving the order information. The order processing engine 404 receives a confirmation from the retailer 110 (or the payment processing system) that the payment has been authorized or the customer has been charged. In response, the order processing engine 404 instructs the order fulfillment engine 206 to proceed with fulfilling the order for the customer.

In some embodiments, the payment engine 216 performs on-demand tokenization of a customer's payment information, e.g., a credit card or a debit card (referred to generally herein as a payment card). On-demand tokenization allows the payment engine 216 to store the card information received from the customer and securely provide the card information to the appropriate payment processing system each time the online concierge system 102 receives an order. This allows the customer to submit additional orders for fulfillment at different retailers (or the same retailer) without having to re-enter payment information. The payment engine 216 securely stores customer payment data 406 received from customers. The customer payment data 406 includes payment card information, including name, number, security code, and expiration date, and a customer account identifier for linking to the payment card to a customer's account. The customer payment data 406 may associate multiple cards with a single customer if the customer has provided multiple payment types, and the customer payment data 406 may include flag indicating a customer's preferred payment card. In some embodiments, the payment card information is stored externally to the payment engine 216, e.g., by a third party vaulting system. In such embodiments, the customer payment data 406 in the payment engine 216 includes references to the payment card information stored by the third party vaulting system.

A payment card token engine 408 performs tokenization of sensitive payment data, such as the number of the customer's payment card. Tokenization refers to a process of substituting a sensitive payment data element (such as a payment card number, bank account number, and/or personally identifiable information (PII)) with a non-sensitive data equivalent. To tokenize payment data, for example, a payment card number, the payment card token engine 408 communicates the payment card number to a token service, which provides a token to the payment card token engine 408. For example, the token service can provide a random string of numbers that maps to a payment card number. In other embodiments, tokenization is performed cryptographically by the payment card token engine 408 according to instructions provided by a token service. After receiving the token, the payment card token engine 408 provides the token to the order processing engine 404. The order processing engine 404 transmits the token, rather than the payment card number, to the payment processing system, which uses the token to charge the customer's payment card. If the token is intercepted during transmission to the payment processing system or is stolen from the payment processing system, it cannot be reversed to obtain the original payment card number. Providing tokens to retailer payment systems, rather than payment card numbers, reduces the risk to the customer of retailer data breaches.

The token service may be provided by the payment processing system, or it may be a separate service. In some embodiments, multiple different token services are available, and the retailer rules 402 indicate which token service to use for a particular payment processing system. For example, one payment processing system may provide its own token service. Another payment processing system may not provide a token service, and instead relies on a particular external token service. The payment card token engine 408 may access the token services via APIs.

A token is typically only valid for a single use or for a set period of time. Each time a new order from a customer is received, the payment card token engine 408 retrieves a new token for the customer's payment card. In other embodiments, the payment card token engine 408 stores a token and retrieves and reuses the same token for subsequent orders charged to the same payment card. In some embodiments, a retailer 110 or the payment processing system associated with the retailer 110 stores the customer's payment information so that for each subsequent order to the same retailer, the payment processing system can look up the stored payment processing information.

Figure 6:
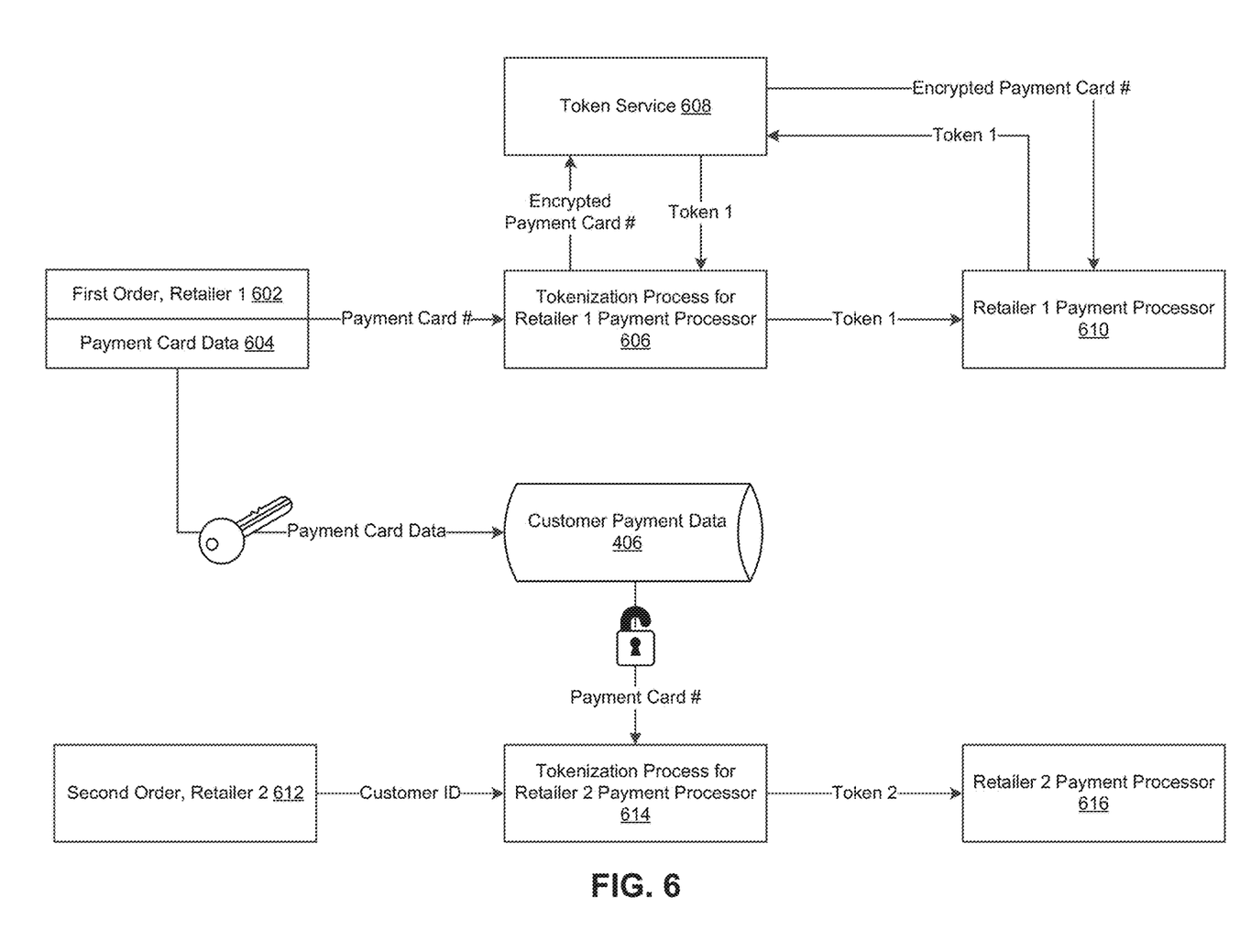
FIG. 6 is a flow diagram illustrating a process for tokenizing payment card data for two different retailers, according to one embodiment.

When an order is fulfilled at a retailer with a different payment processing system from the customer's prior orders, the payment card token engine 408 can provide an on-demand token so that the payment engine 216 and the payment processing system can process the order without the customer re-entering the payment card information. For example, the payment card token engine 408 may access a central vault of tokenized customer payment methods, and this vault may be able to interact with future payment processing systems using a tokenization API interface to each future payment processing system. For example, the vault of tokenized customer payment methods can use a tokenization API interface to a subsequent payment processing system via an interface with the vault. As the online concierge system 102 integrates with additional retailers and/or payment processing systems, the payment engine 216 is thus able to securely provide the customer's payment data to new payment processing systems using the payment card token engine 408 without the customer re-entering the payment card information. An example of obtaining tokens for different orders and payment processing systems is shown in FIG. 6.

The payment engine 216 also includes a reconciliation engine 410, which calculates and implements payment flows based on adjustments to an order after it has been placed. A number of different actions can impact the value and payment of the delivery after the order is received. For example, during picking, a shopper may substitute an item in the order for a different item if the ordered item is not available. As another example, a shopper may not be able to find an item or a suitable replacement, so the item is left out of the delivered order. Information describing the items that were actually picked in each order is reflected in a transaction log 412. The transaction logs 412 list, for each order, at least each item that was picked and the price of the item. The price may be obtained from the inventory database 204. In one embodiment, the SMA 112 transmits the basket to the online concierge system 102, which uses the items in the basket to generate the transaction log 412 for a picked order. In another embodiment, a retailer 110 scans the items picked by the shopper 108 and transmits a list of items or the transaction log to the online concierge system 102.

Other adjustments can be made based on activities after the shopper picks the order. For example, an item may fall out or become damaged en route to the customer (e.g., the shopper may drop a carton of eggs during the delivery). The shopper can provide information describing any impacted items via the SMA 112. Alternatively, the customer can input information describing missing or damaged items via the CMA 106 or by contacting customer service, which provides adjustment data to the online concierge system 102. As another example, the customer can add a tip after delivery using the CMA 106.

Based on the data describing the adjustments, the reconciliation engine 410 calculates adjustments to the payment flows. For the above example with the $110 total order, when the order was received, the expected flows are for the retailer to charge the customer $110 and remit $10 to the online concierge system. In this example, the transaction log 412 indicates that the cost of goods was $5 more than the anticipated $100 due to a substitution, one item valued at $3 was damaged before delivery as reported by the SMA 112, and the customer added a $6 tip after delivery. The reconciliation engine 410 would determine that the total charge to the customer would be $110+$5 (substitution)−$3 (damaged item)+$6 (tip)=$118. Of the $118, the retailer would remit $10+$6 (tip)−$3 (damaged item)=$13 to the online concierge system 102 and keep $105, which is the cost of the items picked at the retailer.

The data describing the payment flows is stored in a database of payment flow reports 414. The payment flow reports 414 keep records of actual payments made by the customers 104 to the retailers 110, and from the retailers 110 to the online concierge system 102. In some cases, the retailer may charge the customer less than the total value of the items, in which case the online concierge system 102 transfers money to the retailer 110 so that the retailer is fully paid for all items picked at the retailer 110. In some embodiments, a retailer 110 provides remittances to the online concierge system 102 (or the online concierge system 102 transfers money to the retailer 110) on a periodic basis, e.g., by grouping all orders fulfilled on a particular day or week and making a bulk payment. The payment engine 216 (e.g., the reconciliation engine 410) can use the payment flow reports 414 to determine the direction and amount of a bulk payment.

Coordinating Payment Flows

The payment engine 216 manages a process for coordinating payment from a customer to the online concierge system 102 and one or more retailers 110. As discussed above, the payment engine 216 calculates payment flows for an order, provides instructions and payment information to one or more retailers 110 for the order, receives authorization from the retailer that the cost of the order can or has been charged to the customer, and adjusts payment flows as needed based on changes to the order. The retailers 110 directly charge the customers for the order based on the order and payment card information provided by the payment engine 216. This reduces the total dollar amounts of the transactions involved in processing an online concierge order compared to prior systems in which the online concierge service charged the customers, and then transferred the bulk of the money collected to retailers. In addition, by storing customers' payment card information and performing on-demand tokenization, the payment engine 216 can coordinate payment between a customer and multiple different retailers, providing a seamless customer experience.

Figure 5:
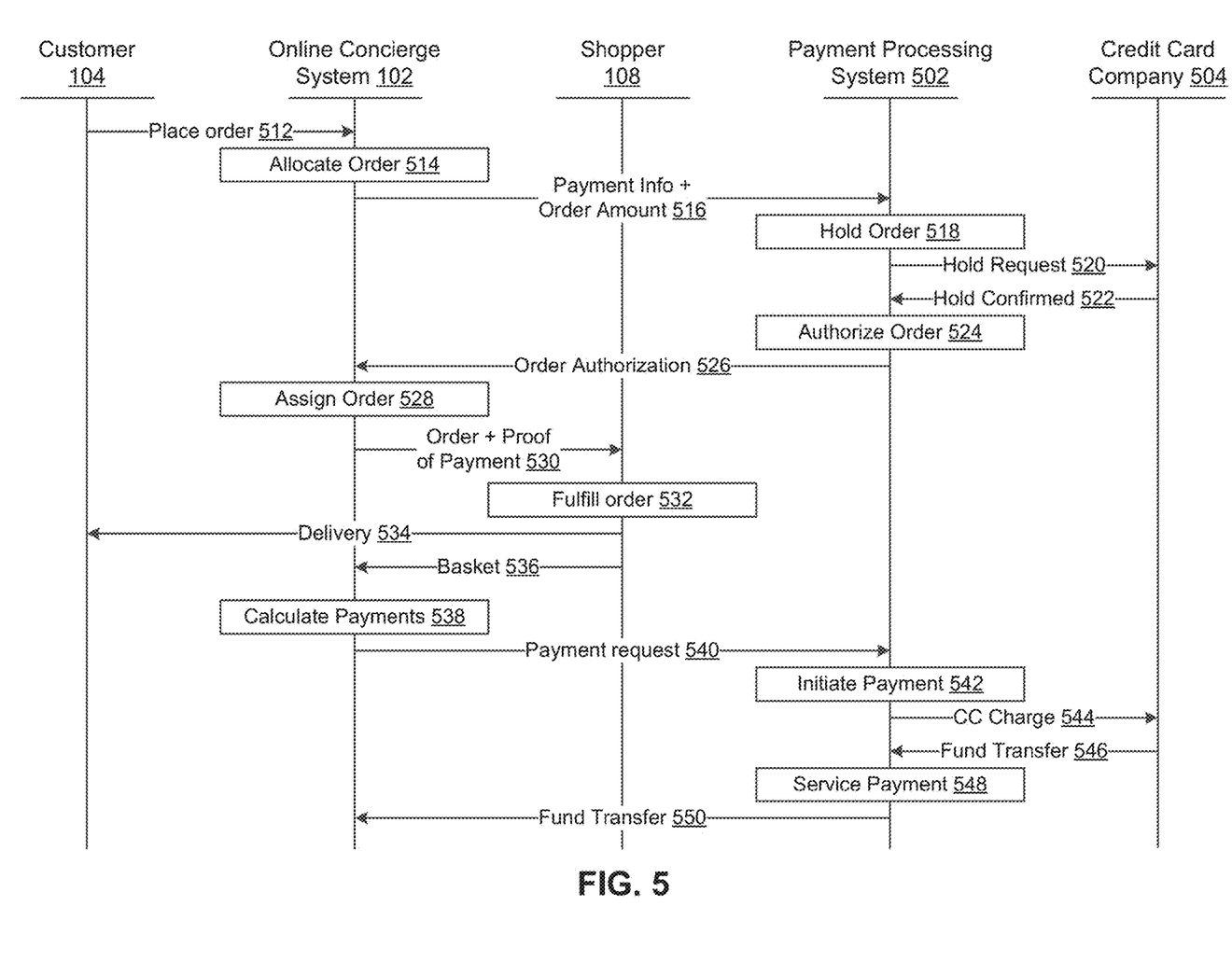
FIG. 5 is an interaction diagram illustrating a process for coordinating payment of a delivery order, according to one embodiment.

FIG. 5 is an interaction diagram illustrating a process for coordinating payment of a delivery order, according to one embodiment. The customer 104 places 512 an order with the online concierge system 102. For example, the customer 104 can use the CMA 106 to place an order, as described above. The online concierge system 102 allocates 514 the order to one or more retailers 110. For example, the order fulfillment engine 206 can perform the allocation by identifying a retailer 110 that has all or most of the items in the order in stock (as indicated in the inventory database 204), is a user's preferred retailer, is within a threshold distance from the delivery location, has a shopper working, or based on one or more other factors.

The online concierge system 102 transmits payment information for the customer and the total amount of the order 516 to the payment process system 502 associated with the retailer 110. As discussed with respect to FIG. 4, the order processing engine 404 identifies the payment processing system 502 based on the retailer rules 402. The order processing engine 404 also calculates an expected total amount for the order based on the items in the order, fee, coupons, discounts, tip, or any other pricing factors. In some embodiments, the order processing engine 404 adds a buffer amount to ensure that the customer's payment card can cover the cost of substitutions. The payment card token engine 408 retrieves a token for the customer's payment card. The online concierge system 102 transmits the payment amount, the token, and any other customer information (e.g., name on card, security code, card type) to the identified payment processing system 502. The order processing engine 102 may also transmit an instruction to the payment processing system 502 to put a hold on the customer's payment card based on the payment amount and payment information, and to confirm the order.

In response to the payment information and order amount 516, the payment processing system 502 initiates a hold order 518 for the payment amount indicated by the online concierge system 102 on the customer's payment card. The payment processing system 502 transmits a hold request 520 to a credit card company 504 for the amount and the payment card. In some embodiments, the payment processing system 502 transmits the token to the credit card company 504, which retrieves the account corresponding to the token. In other embodiments, the payment processing system 502 transmits the token to an external token service, which provides a clean account number that the payment processing system 502 provides to the credit card company 504. In still other embodiments, the payment processing system 502 determines the clean account number of the token using a local database or decoding process. An example of retrieving and using a token is described in further detail with respect to FIG. 6. While in the example shown in FIG. 5 the order is charged to a credit card managed by a credit card company, in other embodiments, the order is charged to a debit card or another type of payment instrument.

If the customer's credit card can be charged the full payment amount, the credit card company 504 authorizes the order, puts a hold on the card for the payment amount, and transmits a hold confirmation 522 to the payment processing system 502. In response, the payment processing system 502 authorizes 524 the order and transmits an order authorization 526 to the online concierge system 102. If the credit card company 504 does not authorize the order, the payment processing system 502 notifies the online concierge system 102, which may request alternative payment information from the customer or cancel the order.

In the embodiment shown, the payment processing system 502 manages the interactions with the credit card company 504, including the authorization. In an alternate embodiment, the online concierge system 102 transmits the hold request 520 to the credit card company 504 and receives the hold confirmation 522 directly from the credit card company 504. The authorization does not charge the customer's credit card, and the payment processing system 502 can later (e.g., upon delivery) charge the customer's credit card a final amount based on the authorization previously performed by the online concierge system 102.

In response to receiving the order authorization 526, the online concierge system 102 assigns 528 the order to a shopper 108. For example, the shopper management engine 210 may assign the order to a shopper as described with respect to FIG. 2. The online concierge system 102 transmits the order information (e.g., the list of items) and proof of payment 530 to the shopper 108, e.g., to the SMA 112. The shopper 108 fulfills 532 the order by collecting the items at the retailer. The shopper 108 can present the proof of payment 530 at the retailer 110 (e.g., to a checkout clerk), and the retailer 110 allows the shopper 108 to remove the items from the store. The shopper 108 delivers 534 the order of to the customer 104. The shopper 108 (or the SMA 112) also provides the basket 536 to the online concierge system 102.

In this embodiment, the shopper 108 scans the items with the SMA 112 to compile the basket 536, which the online concierge system 102 uses to determine the transaction log 412. For example, as discussed above, the shopper 108 may scan each item with a mobile device, and the barcode scanning module 320 provides information describing each picked and scanned item to the basket manager 322, which maintains a list of the picked items in the basket 536. The SMA 112 transfers the basket 536 to the online concierge system 102. Because the shopper 108 has maintained a record of the items, the retailer 110 may not separately scan each item. Instead, the retailer 110 (e.g., a clerk or an automated system in the retailer) may review the proof of payment 530 and check the collected items to ensure to an extent desired by the retailer 110 to ensure that the items correspond to the order that has been or will be paid for. This process, referred to as bypass checkout, allows the shopper 108 to save time by bypassing the standard checkout process and not rescanning each item. Bypass checkout is described in U.S. patent application Ser. No. 15/258,942, published as Publication No. US 2018/0068374, which is incorporated herein by reference in its entirety.

In a second embodiment, the retailer 110 scans all of the collected items at a point of sale (e.g., a checkout counter). In this embodiment, the retailer 110 transmits the basket 536 listing the items to the online concierge system 102. In some embodiments, the retailer 110 transmits a full transaction log 412, including the price for each item that is charged by the retailer 110. This can ensure that the online concierge system 102 has the most up-to-date price for each item. In some embodiments, the online concierge system 102 may receive a basket 536 from both the shopper 108 and the retailer 110.

In some embodiments, rather than or in addition to transmitting the proof of payment 530, the online concierge system 102 transmits the payment token to the SMA 112. The shopper 108 then provides the payment token to the retailer 110 via the SMA 112 at the point of sale. Typically, a customer 104 would not want a third party, such as the shopper 108, to make transactions using the customer's credit card at a point of sale, which is a low-trust payment location. However, tokenizing the credit card number so that it cannot be reversed to obtain the customer's original payment card number means that the shopper 108 can use the token at the retailer 110 without risking the security of the customer's payment information. In this embodiment, the online concierge system 102 may not directly provide the token to the payment processing system 502. For example, in this embodiment, the online concierge system 102 may directly place the hold order with the credit card company 504 to authorize the customer's credit card, as discussed above.

In some embodiments, the online concierge system 102 is configured to use different procedures for different retailers. The retailer rules 402 can indicate the procedure used for each retailer. For example, the retailer rules 402 may indicate that a first retailer uses the bypass checkout method, in which the basket 536 is received from the SMA 112, and the token is received at the payment processing system 502 directly from the online concierge system 102; that a second retailer scans the items at the point of sale and transmits a transaction log to the online concierge system 102, but does not receive payment information at the point of sale; and that a third retailer scans the items at the point of sale, and receives the token for charging the customer at the point of sale. Tokenizing the payment information allows the online concierge system 102 to adapt to different payment procedures, including low-security point of sale transactions, while maintaining customer security.

After the online concierge system 102 receives the list of picked items (as the basket 536 as shown in FIG. 5, or from the retailer 110), the online concierge system 102 calculates 538 the payments for the transaction. As discussed with respect to FIG. 4, the reconciliation engine 410 receives the transaction log 412 for the order, along with any other information that may impact the transactions, such as information about damaged items, missing items, tip to the shopper 108, etc. Based on the received information, the online concierge system 102 determines two payment amounts: a first payment amount that the retailer 110 is paid for the items taken from the retailer, and a second payment amount that is transferred between the retailer 110 and the online concierge system 102. The first payment amount can be calculated from the transaction log, e.g., by summing the values of the items in the transaction log. More generally, the retailer can provide true-up guidelines for deliveries to the online concierge system 102, and the first payment amount can be calculated by summing up the delivery subcomponents indicated by the guidelines. If coupons provided or accepted by the retailer 110 are applied to the order, the first payment amount is reduced by the amount indicated by the coupon or coupons. Alternatively, if the retailer 110 scans the items at a point of sale and provides a report to the online concierge system 102, the retailer 110 may calculate the first payment amount and provide it to the online concierge system 102.

The second payment amount is typically an amount paid to the online concierge system 102 for providing the online concierge service. For example, to calculate the second payment amount, the online concierge system 102 may sum a service fee, a delivery fee, a tip, or other types of fees involved in the online concierge service. The service or delivery fee may be a flat fee or a percentage of the order, or in some cases, both types of fees may be calculated and added together. The online concierge system 102 may also reduce the second payment amount based on coupons or other types of discounts provided or accepted by the online concierge system 102 (e.g., free delivery or a fixed dollar or percentage amount off an order). The online concierge system 102 may also reduce the second payment amount based on additional input from the shopper 108 (e.g., via the SMA 112) or from the customer about the delivery, e.g., if an item was lost or damaged during transit. In some cases, if the magnitude of the discounts and/or reductions is greater than fees and/or tips, the second payment amount is a negative value.

Based on the calculated payments, the online concierge system 102 transmits a payment request 540 to the payment processing system 502. In some embodiments, the online concierge system 102 calculates 538 the payment and transmits the payment request 540 in response to a notification from the SMA 112 that the order has been delivered to the customer. The payment request includes instructions for implementing the payment, e.g., the first payment amount paid to the retailer 110 and the second payment amount paid to, or paid by (if the second payment amount is negative), the online concierge system 102. The payment request also includes an indication of the customer and/or account to charge the payment. If the payment processing system 502 has already received and stored the token (e.g., with the payment information 516 used to authorize the order, or at the point of sale from the SMA 112), the payment request 540 may not include the token, but instead includes sufficient information for the payment processing system 502 to look up the stored token. In other embodiments, e.g., if the token is a single-use token or has expired, the online concierge system 102 generates and transmits a new token.

The sign of the second payment amount indicates the payment flows. If the second payment amount is positive, the online concierge system 102 instructs the payment processing system 502 to charge the customer the sum of the first payment amount and the second payment amount, and to remit the second payment amount to the online concierge system 102. The payment processing system 502 keeps the first payment amount, which equals the cost of the items taken from the retailer 110 by the shopper. If the second payment amount is negative, the online concierge system 102 instructs the payment processing system 502 to charge the customer the difference between the first payment amount and the magnitude of the second payment amount. Thus, the online concierge system 102 charges the customer less than the cost of goods taken from the retailer 110. The online concierge system 102 transfers the second payment amount to the retailer 110 via the payment processing system 502 so that the retailer 110 is made whole for the items picked at the retailer 110 by the shopper.

The payment processing system 502 initiates 542 the payment according to the payment request 540. In alternative embodiments, the online concierge system 102 initiates 542 the payment. In response to the payment initiation, the payment processing system 502 transmits a credit card charge 544 to the credit card company 504 for the account indicated by the received token and the amount indicated by the request. The credit card company 504 transmits a transfer of funds 546 for the requested amount to the payment processing system 502. If the second payment amount is positive and the online concierge system 102 receives payment for the delivery service, the payment processing system 502 initiates the service payment 548 to the online concierge system 102. The payment processing system 502 transmits another fund transfer 550 to the online concierge system 102 for the second payment amount. If the second payment amount is negative, the online concierge system 102 instead transfers money to the payment processing system 502 for the magnitude of the second payment amount.

In some embodiments, the fund transfers 546 and/or 550 are performed on a periodic basis, and the transfers for multiple orders are combined into a single transfer. For example, the payment processing system 502 may make a bulk transfer for the service fees for a day's orders at the end of each day. This reduces the total number of fund transfers 550 between the payment processing system 502 and the online concierge system 102. In addition, if the second payment amount for some orders is negative, and the second payment amount of some orders is positive, combining the transfers for multiple orders causes some of the negative and positive second payment amounts to offset, creating a net flow in one direction which is of a smaller magnitude than the total magnitude of the all of the transfers being made separately.

In addition to the first and second payment amounts calculated upon delivery of the order, the reconciliation engine 414 may identify additional reconciliation payments for actions taken or information received post-delivery, after the payment processing system 502 already charged the customer's credit card based on the first and second payment amounts. For example, a customer may contact customer service about a damaged good or a missing good after receiving the order. Or, a customer may provide a tip amount for the shopper 108 after receiving the order. Based on this information, the reconciliation engine 414 generates a reconciliation payment flow that includes an amount and flow direction. For example, if an item was damaged during delivery, the online concierge system 102 refunds the customer for this item, which involves a flow of money from the online concierge system 102 to the payment processing system 502, and from the payment processing system 502 to the customer via the credit card company 504. If the customer provided a tip post-delivery, the payment would flow from the customer, to the payment processing system 502 (via the credit card company 504), and to the online concierge system 102. If an item was not delivered to the customer, and it can be determined that the item was not taken from the retailer 110 (e.g., based on a record of items received from the point of sale of the retailer 110), the payment would flow from the payment processing system 502 to the customer. After calculating the reconciliation payment flow, the online concierge system 102 transmits the reconciliation payment flow to the payment processing system 502 for implementing the reconciliation payment. If the reconciliation payment flow involves the online concierge system 102 refunding money to the retailer 110 or customer 104, the online concierge system 102 also transfers funds to the payment processing system 502 as indicated by the reconciliation payment flow.

In some embodiments, the reconciliation engine 414 combines the reconciliation payment flows between the online concierge system 102 and the payment processing system 502 for multiple orders. For example, if tips were received for two orders, the reconciliation engine 414 instructs the payment processing system 502 to charge the tips to the credit cards for the two orders, and group the tips into a single transfer to from the payment processing system 502 to the online concierge system 102. As discussed above, combining payment flows decreases the total number of transactions, and if payment flows that are combined have different directions (i.e., some payments flow from the online concierge system 102 to the payment processing system 502, and other payments flow from the payment processing system 502 to the online concierge system 102), combining the reconciliation flows reduces the total magnitude of the transfers. To further reduce the number and magnitude of the payment flows, in some embodiments, the online concierge system 102 combines initial payment flows (e.g., for the service payment 548) with the reconciliation payment flows.

While one retailer 110 is shown in FIG. 5, in some embodiments, an order is allocated to multiple retailers, e.g., based on the items stocked by the retailers. In some embodiments, the order fulfillment engine 206 allocates a portion of an order to a first retailer, such as a retailer at which the majority of the items can be picked. For example, if the order includes food and wine in a state in which alcohol is not stored in grocery stores, the first retailer may be a grocery store at which the food items can be fulfilled. The order fulfillment engine 206 then selects a second retailer for picking a second portion of the items, e.g., a state store at which the wine items are sold. The order fulfillment engine 206 may select the second retailer based on the second retailer using the same payment processing system as the first retailer, which may simplify handling of the order by the payment engine 216.

If multiple retailers are used to fulfill a single order, a similar process to that shown in the remainder of FIG. 5 can be performed with respect to one or more additional retailers at which the order is fulfilled. If two retailers used to fulfill an order use two tokenization processes, the payment engine 216 uses a tokenization process corresponding to the second retailer's payment processing system to generate a second token, transmits the second token to the second payment processing system, and receives an authorization. The payment engine 216 determines a payment amount from the customer to the second retailer based on the portion of items allocated to the second retailer and transmits the payment amount to the second payment processing system, which charges the payment amount to the customer using the second token. If two retailers are used for an order, the payment engine 216 may assign one of the retailers to charge the customer for the fees paid to the online concierge service and remit the service fees back to the online concierge system 102, or the payment engine 216 may allocate the service fees between the two retailers.

FIG. 6 is a flow diagram illustrating a process for tokenizing payment card data for two different retailers, according to one embodiment. A customer 104 submits a first order 602, which the order fulfillment engine 206 allocates to a first retailer, Retailer 1. With the customer's first order, the customer 104 also submits payment card data 604, such as a credit card number, expiration date, security code, and name on the card.

The payment card token engine 408 performs a tokenization process 606 for Retailer 1's payment processor on the payment card number. In the example shown in FIG. 6, the tokenization process 606 involves encrypting the payment card number, transmitting the encrypted payment card number to an external token service 608, and receiving Token 1 from the token service 608. Token 1 may be a temporary number that stands in place of the payment card number and can be shared by the online concierge system 102 with an authorized recipient, in this case, Retailer 1's payment processor 610. The payment card token engine 408 encrypts the payment card number based on an encryption process shared with the token service 608. For example, the token service 608 may provide a key to the payment card token engine 408 that the payment card token engine 408 uses to encrypt the payment card number. The token service 608 may decrypt the payment card number using the key and generate Token 1 based on the clean card number, or the token service 608 may generate Token 1 based on the encrypted card number. The token service 608 may encrypt Token 1 for transmission back to the online concierge system 102.

After receiving Token 1, the online concierge system 102 can provide Token 1 to Retailer 1's payment processor 610, which is an embodiment of the payment processing system 502. The payment processor 610 transmits Token 1 to the token service 608, which transmits to the payment processor 610 an encrypted payment card number that corresponds to Token 1 and to the payment card number provided by the customer 104 with the payment card data 604. The token service 608 may use a different encryption method than the encryption performed by the payment card token engine 408; for example, the token service 608 may provide a different key to the payment processor 610 than the key it provided to the online concierge system. The payment processor 610 decrypts the payment card number and uses it to authorize and charge the customer's payment card, as described with respect to FIG. 5.

In the process shown in FIG. 6, the connections between the online concierge system 102 and the token service 608 and between the token service 608 and payment processor 610 may be more secure than the connection between the online concierge system 102 and the payment processor 610. In alternate embodiments, the payment card number does not pass through the payment processor 610 at all. Instead, the payment processor 610 provides Token 1 to the token service 608, and the token service 608 provides the credit card number to the credit card company 504. The payment processor 610 may also provide the payment to the token service 608, or the payment processor 610 may transmit the payment amount and another customer identifier to the credit card company 504. In this embodiment, the credit card number completely bypasses the payment processor 610 and the retailer 110. This arrangement reduces the number of times that the payment card number is transmitted, and maintains customer security in the case of a data breach at the retailer 110 or payment processor 610.

In addition to generating Token 1, which is used to charge the customer for the first order 602, the payment engine 216 securely stores the payment card data in the database of customer payment data 406. This data may be secured using one or more techniques, such as encryption, tokenization, partitioning, etc. Alternatively, as described above, the customer payment data may be stored at an external system (e.g., by a third party vaulting service), and the payment engine 216 stores references to the customer payment data. In the example shown in FIG. 6, the online concierge system 102 receives a second order 612 from the same customer, which the order fulfillment engine 206 allocates to a second retailer. Based on a customer identifier associated with the order, the payment engine 216 retrieves the customer's payment card information, including the payment card number, from the database of customer payment data 406. The payment card token engine 408 then performs a tokenization process 614 for Retailer 2's payment processor. The tokenization process 614 may be similar to the tokenization process 606, and the specifics of the payment process used by Retailer 2's payment processor 616 are provided by the payment processor 616 and stored in the retailer rules 402. For example, the tokenization process 614 may use a different encryption scheme, encryption key, and/or tokenization service from the tokenization process 606 for Retailer 1's payment processor 610.

The tokenization process 614 provides Token 2 to the payment engine 216. The online concierge system 102 transmits Token 2 to Retailer 2's payment processor 616, which uses Token 2 to charge the customer's payment card.

A similar process of tokenizing a customer's payment card can be performed each time an order is received, with the particulars of the process based on the retailer and payment processor. In some embodiments, the payment card token engine 408 may perform tokenization of alternate or additional payment information, e.g., the name on the card or the security code. In one embodiment, the payment card token engine 408 may transmit one portion of the payment card number to one token service, and a second portion of the payment card number to a second token service.

Figure 7:
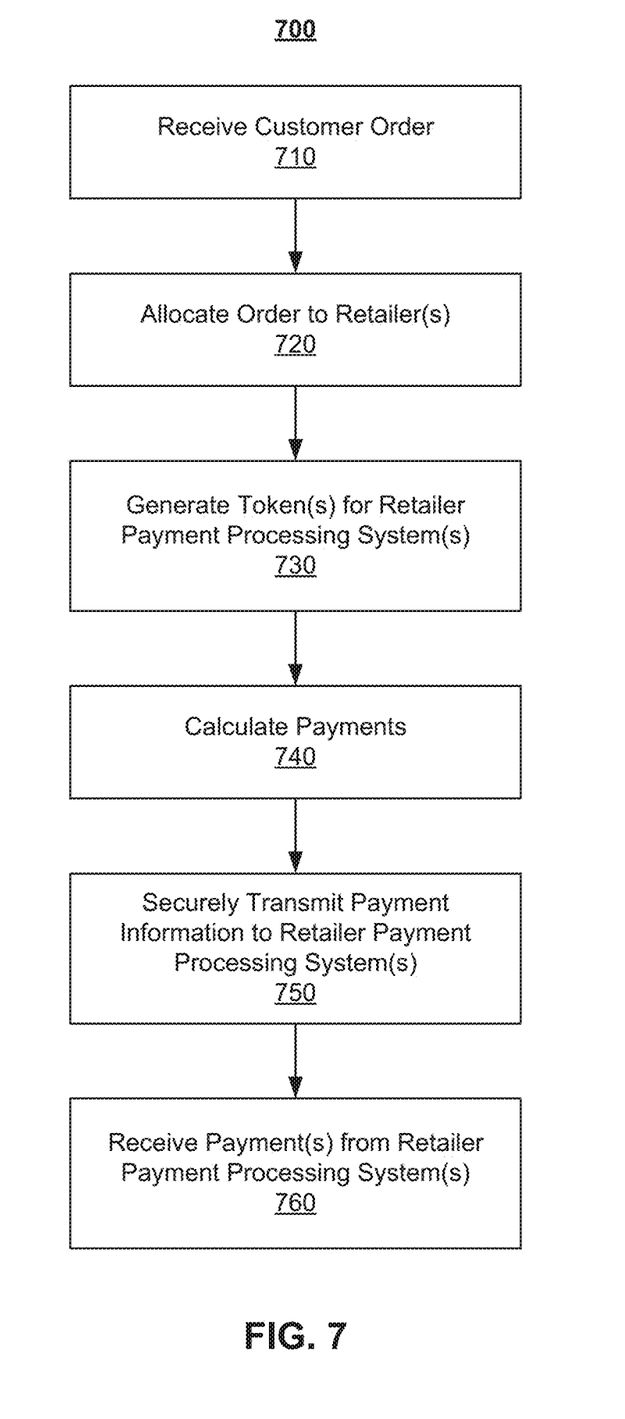
FIG. 7 is a flow diagram illustrating a process for processing payments of an order by an online concierge system, according to one embodiment.

FIG. 7 is a flow diagram illustrating a process 700 for processing payments of an order by an online concierge system, according to one embodiment. The online concierge system 102 receives 710 a customer order. For example, the customer 104 may submit an order with a list of items using the CMA 106, as described with respect to FIGS. 3A and 5.

The online concierge system 102 allocates 720 the order to one or more retailers 110. For example, the order fulfillment engine 206 may allocate the order to a retailer as described with respect to FIGS. 2 and 5.

The online concierge system 102 generates 730 a payment token for each the payment processing system 502 used by retailer 110 to which the order was allocated. For example, the order processing engine 404 identifies the payment processing systems based on the retailer rules 402, as described with respect to FIG. 4, and the payment card token engine 408 generates a token for each payment processing system based on received or saved customer payment card data, as described with respect to FIGS. 4 and 6.

The online concierge system 102 calculates 740 payments between the customer 104, the retailer 110, and the online concierge system 102. For example, the online concierge system 102 calculates a first payment to the retailer, and a second payment between the retailer and the online concierge system 102, which can be summed to determine the amount that the retailer collects from the customer 104, as described with respect to FIGS. 4 and 5.

The online concierge system 102 securely transfers 750 payment information to the payment processing systems 502. For example, the online concierge system 102 transmits the token for the customer's payment card to each corresponding payment processing system 502, as described with respect to FIGS. 4-6. The token is a secure method of transmitting payment card information across a network. In addition, the online concierge system 102 transmits a payment request based on the payment calculation 740 with instructions for implementing the payment, as described above with respect to FIG. 5. The token and payment request may be transmitted separately or together.

The online concierge system 102 receives 760 a payment from the payment processing system(s) based on the payment request. For example, a payment processing system 502 may remit a portion of the money received from a customer's credit card to cover the service fee, delivery fee, and/or tip.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for coordinating payment of a delivery order comprising:
    receiving an order from a customer, the order specifying a list of ordered items to be fulfilled by an online concierge system;
    allocating the order to a retailer at which at least a portion of the ordered items can be picked, the retailer associated with a payment processing system of a plurality of payment processing systems, each of the plurality of payment processing systems having a corresponding tokenization process;
    using the tokenization process corresponding to the payment processing system to generate a payment token for the customer, wherein the tokenization process comprises:
        encrypting stored payment data for the customer using a key provided by a token service;
        transmitting the encrypted payment data to the token service; and
        receiving the payment token from the token service;
    transmitting the payment token to the payment processing system;
    determining a first payment amount from the customer to the retailer based on items picked at the retailer and a second payment amount from the retailer to the online concierge system;
    transmitting a payment request from the online concierge system to the payment processing system, the payment request comprising the first payment amount and the second payment amount, wherein the payment processing system charges the customer the first payment amount and the second payment amount using the payment token; and
    receiving, at the online concierge system from the payment processing system, the second payment amount.

2. The method of claim 1, wherein determining the first payment amount from the customer to the retailer comprises:
    receiving a list of the items picked at the retailer, wherein at least one picked item is a replacement for an ordered item in the list of ordered items;
    determining a value for each picked item in the list of picked items; and
    summing the values of the picked items in the list of picked items.

3. The method of claim 1, wherein determining the first payment amount from the customer to the retailer based on items picked at the retailer comprises receiving receipt information including the first payment amount from a point of sale of the retailer.

4. The method of claim 1, wherein determining the second payment amount from the retailer to the online concierge system comprises at least one of:
    adding a service fee to the second payment amount, the service fee comprising at least one of a flat service fee and a percentage of the first payment amount;
    adding a tip amount received from the customer to the second payment amount;
    reducing the second payment amount based on a discount.

5. The method of claim 1, further comprising:
    generating a reconciliation payment flow comprising an amount and a flow direction based on an action impacting payment of the delivery order, the online concierge system receiving data describing the action subsequent to the payment processing system charging the customer the first payment amount and the second payment amount; and
    transmitting the reconciliation payment flow to the payment processing system for implementing the reconciliation payment flow.

6. The method of claim 5, wherein generating the reconciliation payment flow further comprises:
    calculating a first reconciliation for the order from the customer, the first reconciliation having a first payment amount and first flow direction;
    calculating a second reconciliation for a second order for a second customer, the second reconciliation having a second reconciliation payment amount and second flow direction;
    combining at least the first reconciliation and the second reconciliation to determine an amount and flow direction between the payment processing system and the online concierge system.

7. The method of claim 1, further comprising:
    transmitting a hold order amount to the payment processing system with the payment token;
    receiving, from the payment processing system, an authorization for the hold order amount;
    in response to receiving the authorization, generating a proof of payment for the order; and
    transmitting the proof of payment to a device associated with a shopper, wherein displaying the proof of payment on the device allows the shopper to collect the items picked at the retailer from the retailer.

8. The method of claim 1, further comprising:
    receiving a notification from a mobile device of a shopper that the order was delivered to the customer; and
    transmitting the payment request from the online concierge system to the payment processing system in response to receiving the notification.

9. The method of claim 1, wherein allocating the order to the retailer at which at least a portion of the ordered items can be picked comprises allocating a first portion of the ordered items to the retailer and a second portion of the ordered items to a second retailer, the second retailer associated with a second payment processing system, and the method further comprising:

using the tokenization process corresponding to the second payment processing system to generate a second payment token for the customer based on the stored payment data for the customer;

transmitting the second payment token to the second payment processing system;

determining a third payment amount from the customer to the second retailer based on the second portion of the ordered items; and transmitting a second payment request from the online concierge system to the second payment processing system, the second payment request comprising the third payment amount, wherein the second payment processing system charges the customer the third payment amount using the second payment token.

10. The method of claim 1, wherein allocating the order to a retailer at which at least a portion of the ordered items can be picked comprises:

determining a first retailer for picking a first portion of the ordered items;

identifying a first payment processing system associated with the first retailer; and determining a second retailer for picking a second portion of the ordered items can be picked, the second retailer selected based on (1) availability of the second portion of the ordered items at the second retailer and (2) the second retailer being associated with the first payment processing system.

11. A non-transitory computer-readable storage medium storing instructions for coordinating payment of a delivery order, the instructions when executed causing a processor to:

receive an order from a customer, the order specifying a list of ordered items to be fulfilled by an online concierge system;

allocate the order to a retailer at which at least a portion of the ordered items can be picked, the retailer associated with a payment processing system of a plurality of payment processing systems, each of the plurality of payment processing systems having a corresponding tokenization process;

use the tokenization process corresponding to the payment processing system to generate a payment token for the customer, wherein the tokenization process comprises:

encrypting stored payment data for the customer using a key provided by a token service;

transmitting the encrypted payment data to the token service; and receiving the payment token from the token service;

transmit the payment token to the payment processing system;

determine a first payment amount from the customer to the retailer based on items picked at the retailer and a second payment amount from the retailer to the online concierge system;

transmit a payment request from the online concierge system to the payment processing system, the payment request comprising the first payment amount and the second payment amount, wherein the payment processing system charges the customer the first payment amount and the second payment amount using the payment token; and receive, at the online concierge system from the payment processing system, the second payment amount.

12. The computer-readable storage medium of claim 11, wherein determining the first payment amount from the customer to the retailer further comprises:

receiving a list of the items picked at the retailer, wherein at least one picked item is a replacement for an ordered item in the list of ordered items;

determining a value for each picked item in the list of picked items; and summing the values of the picked items in the list of picked items.

13. The computer-readable storage medium of claim 11, wherein determining the first payment amount from the customer to the retailer based on items picked at the retailer comprises receiving receipt information including the first payment amount from a point of sale of the retailer.

14. The computer-readable storage medium of claim 11, wherein determining the second payment amount from the retailer to the online concierge system comprises at least one of:

adding a service fee to the second payment amount, the service fee comprising at least one of a flat service fee and a percentage of the first payment amount;

adding a tip amount received from the customer to the second payment amount;

reducing the second payment amount based on a discount.

15. The computer-readable storage medium of claim 11, wherein the instructions when executed further cause the processor to:

generate a reconciliation payment flow comprising an amount and a flow direction based on an action impacting payment of the delivery order, the online concierge system receiving data describing the action subsequent to the payment processing system charging the customer the first payment amount and the second payment amount; and transmit the reconciliation payment flow to the payment processing system for implementing the reconciliation payment flow.

16. The computer-readable storage medium of claim 15, wherein generating the reconciliation payment flow further comprises:

calculating a first reconciliation for the order from the customer, the first reconciliation having a first payment amount and first flow direction;

calculating a second reconciliation for a second order for a second customer, the second reconciliation having a second reconciliation payment amount and second flow direction;

combining at least the first reconciliation and the second reconciliation to determine an amount and flow direction between the payment processing system and the online concierge system.

17. The computer-readable storage medium of claim 11, wherein the instructions when executed further cause the processor to:

transmit a hold order amount to the payment processing system with the payment token;

receive, from the payment processing system, an authorization for the hold order amount;

in response to receiving the authorization, generate a proof of payment for the order; and transmit the proof of payment to a device associated with a shopper, wherein displaying the proof of payment on the device allows the shopper to collect the items picked at the retailer from the retailer.

18. The computer-readable storage medium of claim 11, wherein the instructions when executed further cause the processor to:

receive a notification from a mobile device of a shopper that the order was delivered to the customer; and transmit the payment request from the online concierge system to the payment processing system in response to receiving the notification.

19. The computer-readable storage medium of claim 11, wherein allocating the order to the retailer at which at least a portion of the ordered items can be picked comprises allocating a first portion of the ordered items to the retailer and a second portion of the ordered items to a second retailer, the second retailer associated with a second payment processing system, and the instructions when executed further cause the processor to:
 use the tokenization process corresponding to the second payment processing system to generate a second payment token for the customer based on the stored payment data for the customer;
 transmit the second payment token to the second payment processing system;
 determine a third payment amount from the customer to the second retailer based on the second portion of the ordered items; and
 transmit a second payment request from the online concierge system to the second payment processing system, the second payment request comprising the third payment amount, wherein the second payment processing system charges the customer the third payment amount using the second payment token.

20. The computer-readable storage medium of claim 11, wherein allocating the order to a retailer at which at least a portion of the ordered items can be picked comprises:
 determining a first retailer for picking a first portion of the ordered items;
 identifying a first payment processing system associated with the first retailer; and
 determining a second retailer for picking a second portion of the ordered items can be picked, the second retailer selected based on (1) availability of the second portion of the ordered items at the second retailer and (2) the second retailer being associated with the first payment processing system.

\* \* \* \* \*